(12) United States Patent
Goodzeit

(10) Patent No.: US 6,695,263 B1
(45) Date of Patent: Feb. 24, 2004

(54) SYSTEM FOR GEOSYNCHRONOUS SPACECRAFT RAPID EARTH REACQUISITION

(75) Inventor: Neil E. Goodzeit, Princeton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/073,013

(22) Filed: Feb. 12, 2002

(51) Int. Cl.[7] .................................................. B64G 1/24
(52) U.S. Cl. .......................................... 244/164; 244/171
(58) Field of Search ................................. 244/164, 171, 244/165

(56) References Cited

U.S. PATENT DOCUMENTS

| | | |
|---|---|---|
| 3,813,067 A | 5/1974 | Mork |
| 4,062,509 A | 12/1977 | Muhlfelder et al. |
| 4,071,211 A | 1/1978 | Muhlfelder et al. |
| 4,219,940 A | 9/1980 | Okubo |
| 4,537,375 A | 8/1985 | Chan |
| 4,654,846 A | 3/1987 | Goodwin et al. |
| 4,754,280 A | 6/1988 | Brown et al. |
| 4,767,084 A | 8/1988 | Chan et al. |
| 4,890,284 A | 12/1989 | Murphy et al. |
| 5,025,381 A | 6/1991 | Goodzeit et al. |
| 5,058,835 A | 10/1991 | Goodzeit et al. |
| 5,062,051 A * | 10/1991 | Sainct et al. ................. 244/171 |
| 5,080,307 A * | 1/1992 | Smay et al. ................. 244/164 |
| 5,092,543 A | 3/1992 | Goodzeit |
| 5,100,084 A | 3/1992 | Rahn et al. |
| 5,123,617 A | 6/1992 | Linder et al. |
| 5,139,218 A | 8/1992 | Bird et al. |
| 5,201,833 A | 4/1993 | Goodzeit et al. |
| 5,205,518 A | 4/1993 | Stetson, Jr. |
| 5,248,118 A | 9/1993 | Cohen et al. |
| 5,277,385 A * | 1/1994 | Flament ...................... 244/164 |
| 5,284,309 A | 2/1994 | Salvatore et al. |
| 5,307,206 A | 4/1994 | Haessig, Jr. |
| 5,308,024 A | 5/1994 | Stetson, Jr. |
| 5,335,179 A | 8/1994 | Boka et al. |
| 5,343,398 A | 8/1994 | Goodzeit et al. |
| 5,349,532 A | 9/1994 | Tilley et al. |

(List continued on next page.)

FOREIGN PATENT DOCUMENTS

| | | |
|---|---|---|
| EP | 0499815 | 8/1992 |
| EP | 0568209 | 11/1993 |
| EP | 0604214 | 6/1994 |
| EP | 0780298 | 6/1997 |
| EP | 0922635 | 6/1999 |
| EP | 0937644 | 8/1999 |
| EP | 1024082 | 8/2000 |
| JP | 321597 | 1/1991 |

OTHER PUBLICATIONS

Voss, L. "New Thrust for U.S. Satellites", Aerospace America, American Institute of Aeronautics & Astronautics, New York, vol. 38, No. 2, Feb. 2000, pp. 36–40.

"Electric Propulsion", Aerospace America, American Institute of Aeronautics & Astronautics, New York, vol. 30, No. 12, Dec. 1, 1992, p. 42.

Anzel, B., "Stationkeeping the Hughes HS 702 Satellite with a Xenon Ion Propulsion System," Congress of the International Astronautical Federation, Sep. 28, 1998.

*Primary Examiner*—Charles T. Jordan
*Assistant Examiner*—Stephen A Holzen
(74) *Attorney, Agent, or Firm*—Townsend and Townsend and Crew LLP

(57) ABSTRACT

A method for rapid earth reacquisition of a spacecraft. A three-axis inertial attitude of the spacecraft is determined by rotating the spacecraft about its pitch axis while measuring star patterns. A pitch axis of the spacecraft is aligned with earth's pole axis. The spacecraft is reoriented with respect to an earth-pointing reference frame.

56 Claims, 2 Drawing Sheets

System for Rapid Earth Re-acquisition

U.S. PATENT DOCUMENTS

| | | |
|---|---|---|
| 5,354,016 A | 10/1994 | Goodzeit et al. |
| 5,400,252 A | 3/1995 | Kazimi et al. |
| 5,412,574 A | 5/1995 | Bender et al. |
| 5,424,872 A | 6/1995 | Lecuyer et al. |
| 5,433,402 A | 7/1995 | Surauer et al. |
| 5,452,869 A * | 9/1995 | Basuthakur et al. ........ 244/164 |
| 5,458,300 A | 10/1995 | Flament et al. |
| 5,546,309 A * | 8/1996 | Johnson et al. ............ 244/164 |
| 5,556,058 A | 9/1996 | Bender |
| 5,562,266 A * | 10/1996 | Achkar et al. .............. 244/171 |
| 5,597,142 A * | 1/1997 | Leung et al. ................ 244/164 |
| 5,608,634 A | 3/1997 | Goodzeit et al. |
| 5,610,820 A | 3/1997 | Shankar et al. |
| 5,646,847 A | 7/1997 | Ratan et al. |
| 5,654,549 A | 8/1997 | Landecker et al. |
| 5,687,933 A | 11/1997 | Goodzeit et al. |
| 5,692,707 A | 12/1997 | Smay |
| 5,738,309 A | 4/1998 | Fowell |
| 5,745,869 A | 4/1998 | van Bezooijen |
| 5,749,545 A * | 5/1998 | Gnatjuk ...................... 244/164 |
| 5,765,780 A | 6/1998 | Barskey et al. |
| 5,799,904 A | 9/1998 | Goodzeit et al. |
| 5,806,804 A | 9/1998 | Goodzeit et al. |
| 5,813,633 A | 9/1998 | Anzel |
| 5,845,880 A | 12/1998 | Petrosov et al. |
| 5,931,421 A | 8/1999 | Surauer et al. |
| 5,984,236 A | 11/1999 | Keitel et al. |
| 5,984,237 A | 11/1999 | Goodzeit |
| 5,996,941 A | 12/1999 | Surauer et al. |
| 6,026,337 A | 2/2000 | Krigbaum et al. |
| 6,032,904 A | 3/2000 | Hosick et al. |
| 6,039,290 A | 3/2000 | Wie et al. |
| 6,047,927 A | 4/2000 | Heiberg et al. |
| 6,089,507 A * | 7/2000 | Parvez et al. ........... 244/158 R |
| 6,102,337 A | 8/2000 | Quartararo |
| 6,108,594 A * | 8/2000 | Didinsky et al. ............ 244/164 |
| 6,116,543 A | 9/2000 | Koppel |
| 6,145,790 A * | 11/2000 | Didinsky et al. ............ 244/164 |
| 6,213,432 B1 | 4/2001 | Koppel |
| 6,260,805 B1 | 7/2001 | Yocum, Jr. et al. |
| 6,282,467 B1 * | 8/2001 | Shah et al. .................. 244/164 |
| 6,285,927 B1 * | 9/2001 | Li et al. ...................... 244/164 |
| 6,285,928 B1 | 9/2001 | Tilley et al. |
| 6,292,722 B1 | 9/2001 | Holmes et al. |
| 6,296,207 B1 | 10/2001 | Tilley et al. |
| 6,314,344 B1 | 11/2001 | Sauer et al. |
| 6,318,676 B1 * | 11/2001 | Turner et al. ................ 244/165 |
| 6,327,523 B2 | 12/2001 | Cellier |
| 6,336,062 B1 | 1/2002 | Yamashita |
| 6,356,815 B1 * | 3/2002 | Wu et al. .................... 244/164 |
| 6,381,520 B1 | 4/2002 | Higham et al. |
| 6,389,336 B2 | 5/2002 | Cellier |
| 6,442,385 B1 | 8/2002 | Marko |
| 6,470,243 B1 | 10/2002 | Eyerly et al. |
| 6,481,672 B1 | 11/2002 | Goodzeit et al. |
| 2002/0119750 A1 | 8/2002 | Youssefi |

* cited by examiner

SYSTEM FOR GEOSYNCHRONOUS SPACECRAFT RAPID EARTH REACQUISITION

FIELD OF THE INVENTION

The present invention relates to a system and method for re-establishing the earth-pointing attitude of a spacecraft from an arbitrary non-earth-oriented attitude.

BACKGROUND OF THE INVENTION

For any spacecraft, it is desired to maintain a certain orientation of the spacecraft with respect to various objects. For geosynchronous spacecraft, the normal mission attitude is such that the spacecraft points its communications antennas at some location on the Earth's surface. Typically, the Earth or one or more stars provide reference vectors that permit the orientation of antennas, sensors, and other devices that make communications with the spacecraft possible and are necessary to carry out mission operations. Despite the presence of sophisticated spacecraft on-board fault detection and correction systems, anomalies can occur that cause a loss of earth pointing control.

During non-earth-pointing periods the spacecraft cannot perform its mission, and this may cause a loss of revenue or other negative impacts to companies that rely on the spacecraft to support their businesses. Therefore, to limit these negative impacts, it is desired to have a spacecraft that can re-establish normal earth pointing as quickly as possible, and with minimum interaction with ground operators. Unfortunately, current re-acquisition methods do not provide the called-for quick recovery capability.

According to one example, if the inertial reference of some spacecraft is corrupted, the satellite must execute a full sky search to locate the Earth. In the worst-case scenario, the Earth search may involve up to four 360 degree rotations about the spacecraft roll axis and three large-angle pitch/yaw attitude slews. The entire re-acquisition sequence can take up to 5 hours, during which time the spacecraft may be in a poor power, thermal, and communications attitude. Even after Earth-lock is established, another 19 hours may be required to restore normal pointing performance. This stems at least from the fact that sun sensor yaw data may only be available for a limited portion of the orbit, e.g., for approximately 5 hours or less.

With the trend to larger spacecraft, the situation is even worse, because lower search rates must be used to accommodate limitations imposed by the available thruster torque capability or reaction wheel momentum storage capability. Virtually no spacecraft is immune to re-acquisition performance issues. According to one example utilized in a large spacecraft, to re-acquire the normal mission attitude, the spacecraft first locates and locks on the Sun, and then executes a rotation about the Sun line to locate the Earth. The Sun/Earth acquisition is not always a favored approach because it can unnecessarily delay the return to normal earth-pointing operations.

SUMMARY OF THE INVENTION

The present invention overcomes problems in the art associated with lengthy earth reacquisition times. Thereby, the present invention can reduce downtime of a spacecraft and/or negative consequences of an orientation of a spacecraft other than a desired orientation.

A method for rapid earth reacquisition of a spacecraft. According to the method, a three-axis inertial attitude of the spacecraft is determined by rotating the spacecraft about its pitch axis while measuring star patterns. A pitch axis of the spacecraft is aligned with earth's pole axis. The spacecraft is reoriented with respect to an earth-pointing reference frame.

The present invention also provides a system f or rapid earth reacquisition of a spacecraft. The system includes at least one star tracker operable to measure star patterns. At least one control actuator is operable to alter an attitude of the spacecraft. At least one processor is operable to determine a three-axis inertial attitude of the spacecraft by rotating the spacecraft about its pitch axis while analyzing star patterns measured with the at least one star tracker, aligning a pitch axis of the spacecraft with earth's pole axis, and reorienting the spacecraft with respect to an earth-pointing reference frame by commanding the at least one control actuator to alter the attitude of the spacecraft.

Still other objects and advantages of the present invention will become readily apparent by those skilled in the art from a review of the following detailed description. The detailed description shows and describes preferred embodiments of the invention, simply by way of illustration of the best mode contemplated of carrying out the present invention. As will be realized, the present invention is capable of other and different embodiments and its several details are capable of modifications in various obvious respects, without departing from the present invention. Accordingly, the drawings and description are illustrative in nature and not restrictive.

BRIEF DESCRIPTION OF THE DRAWINGS

Objects and advantages of the present invention will be more clearly understood when considered in conjunction with the accompanying drawings, in which.

DETAILED DESCRIPTION OF THE INVENTION

Figure 1:
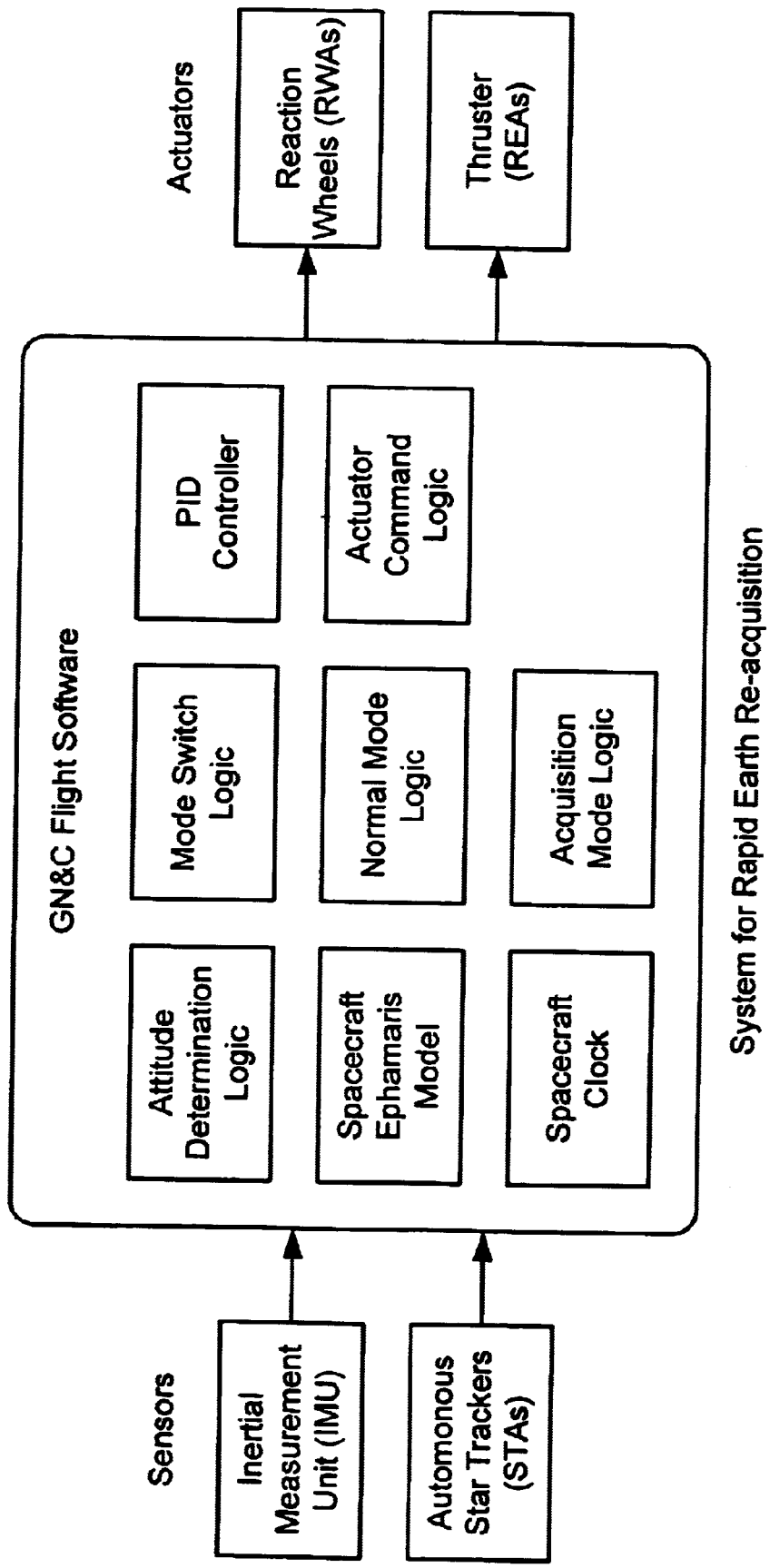
FIG. 1 represents a diagram that illustrates major components of an embodiment of a system for rapid earth reacquisition according to the present invention.

The present invention provides geosynchronous spacecraft with a rapid Earth re-acquisition capability that avoids a time consuming full-sky Earth search or Sun/Earth acquisition. The spacecraft can be in any arbitrary initial attitude, without valid inertial attitude information, without valid spacecraft ephemeris information, and/or without a valid clock. Compared to currently utilized systems, the present invention can greatly reduce the time necessary for Earth reacquisition.

In general, the present invention concerns a method for earth reacquisition of a spacecraft. According to the method, a three-axis inertial attitude of the spacecraft is determined. The spacecraft may include at least one sensor and a processor for measuring the three-axis attitude.

A pitch axis of the spacecraft is aligned with a pole axis of the earth. The spacecraft may be aligned utilizing a plurality of thrusters. Various thruster types may be utilized including hydrazine thrusters or bi-propellant thrusters. Alternatively, other control actuators such as reaction wheels may be used to provide control.

According to the present invention, following loss of earth lock, the spacecraft determines its inertial attitude by slowly rotating about the pitch axis so that the star trackers traverse the star field. During the rotation, the pitch axis is controlled to a fixed inertial orientation. This inertial orientation is the attitude of the pitch axis at the time of entry into the re-acquisition control mode. An inertial target vector is computed by transforming the body pitch axis to the inertial frame, using the current inertial attitude estimate at mode entry, which at that time may not be a valid indicator of the spacecraft attitude. The star trackers are oriented with respect to the spacecraft pitch axis, so that within a complete revolution, each star tracker is guaranteed at some time to have a view of space unobstructed by the Sun, Moon, or Earth. The rotation may be carried out at a rate of about 0.2 to 0.3 degrees per second. Hence, the time necessary to complete a rotation is between 20 to 30 minutes.

Once the inertial attitude is computed, the spacecraft re-orients to align the pitch axis with the earth pole axis. In this orientation, the spacecraft yaw/roll plane is parallel to the Earth's equatorial plane, and communications will be possible with the ground during some significant portion, if not all, of a pitch rotation. During the portion of the rotation where contact is possible, the ground can verify the on-board clock and ephemeris, and manually switch to the normal star-tracker based earth-pointing mode. In an alternative embodiment, as the spacecraft rotates, an uplink carrier signal strength is monitored on-board the spacecraft to determine the direction of maximum signal strength. The maximum signal strength occurs when the spacecraft antenna is facing the Earth. Using the signal strength information, the spacecraft establishes itself in an earth-facing pitch attitude, performs an ephemeris/clock validity check, and automatically switches to the normal star-tracker based earth-pointing mode.

In determining the attitude of the spacecraft, star patterns may be measured with at least one sensor as the spacecraft rotates about the spacecraft pitch axis, with the pitch axis controlled to a fixed inertial attitude. The star sensor may be in the form of an autonomous star tracker (STA). The STA can include a star catalog and logic that allows it to determine its three-axis inertial attitude from star measurements. The STA may include a processor for carrying out the attitude determination computations.

The spacecraft processor may also be utilized to compare the measured star patterns with a star catalog to determine the three-axis inertial attitude of the spacecraft. In determining the attitude of the spacecraft, the orientation of the at least one star tracker with respect to the inertial frame may be determined. The processor may utilize a Kalman filter to determine the inertial attitude of the spacecraft as described below in greater detail. The Kalman filter may determine the spacecraft inertial attitude and gyro rate biases using estimates of the spacecraft inertial attitude obtained by propagating Inertial Measurement Unit (MU) angular rate data and attitude estimates determined from star tracker measurements.

After reorienting the spacecraft, the accuracy of a spacecraft on-board clock and on-board ephemeris may be verified by the ground.

An Earth re-acquisition sequence according to the present invention may be accomplished in three simple steps that typically take less than 1.5 hours. Step 1 can involve the rotation of the spacecraft about the pitch axis. Typically, the spacecraft is rotated slowly. The mounting angle of the star tracker can guarantee that within one rotation the tracker will have sufficient view of the unobstructed star field to determine its attitude.

In step 2, the attitude of the spacecraft can be adjusted to align the pitch axis with the Earth pole axis. Knowledge of this axis does not depend on knowledge of the time or the spacecraft's orbital position. Once in this attitude, the spacecraft may be rotated slowly about its pitch axis to maintain good power conditions and to establish communications with the ground. To complete the re-acquisition, or step three, the ground may upload a valid spacecraft clock and ephemeris. The spacecraft may then begin to rotate to align its body axes with the Earth-pointing reference frame. The present invention can also be enhanced by establishing a pitch reference angle based on the uplink carrier signal strength during one rotation about the pitch axis in Step 2. The final transition to an Earth-pointing reference frame in Step 3 can thereby be automated based on the measured pitch reference angle.

FIG. 1 represents a block diagram that illustrates an attitude control system according to the invention. The system may utilize attitude information from a pair of STAs, and angular rate information from an IMU. Two STAs are provided for redundancy, although only a single STA is needed to perform attitude re-acquisition. Attitude control may be provided using reaction wheels or thrusters, or a combination of both. The spacecraft attitude determination and control logic, including the logic necessary for attitude re-acquisition, resides in the spacecraft on-board processor.

Each STA can include its own internal star catalog and logic that matches measured star patterns to the catalog to determine its three-axis inertial attitude. Alternatively, a separate processor on the spacecraft may carry out such functions. Once the tracker's attitude is known, the spacecraft's attitude may be easily determined, based on knowledge of the tracker's orientation in the spacecraft body frame. The attitude determination logic may employ a Kalman filter to combine the IMU rate data and the tracker output quaternion (tracker inertial attitude) to obtain low-noise estimates of the spacecraft inertial attitude and estimates of the IMU gyro biases. In addition, Earth pointing typically requires both a valid spacecraft clock and valid spacecraft ephemeris model. The ephemeris provides the transformation from the inertial frame to an Earth-pointing reference frame. In the normal control mode, the spacecraft body frame typically is aligned with the Earth pointing reference frame to allow proper operation of the communications payload.

In the event of an anomaly that causes loss of the inertial reference or other critical on-board information, such as clock, ephemeris, and/or other elements, Earth-pointing cannot be maintained and a re-acquisition may be necessary to restore normal operations. The re-acquisition may be performed using special control logic, designated as acquisition mode logic in FIG. 1. This logic can calculate attitude and rate errors that are input to a proportional-interal-derivative (PID) controller. The PID controller can calculate torque commands that may be utilized by the actuator command logic to determine the reaction wheel torque commands and thruster pulse widths necessary for attitude control. The acquisition mode logic can calculate attitude and rate errors to cause a specified axis in the spacecraft body frame to become aligned with a specified inertial axis. Once the inertial axis is acquired, the spacecraft may be rotated about the inertial axis at a commanded rate. Such logic is sometimes referred to as a cross-product control law.

The rapid re-acquisition system can utilize the simple three step process described above to restore Earth pointing control. The approach is significantly faster than known Earth search or Sun/Earth acquisition methods. In Step 1, the acquisition system may calculate an inertial target vector and then rotate in pitch to allow the STA to determine its attitude. The target vector may be calculated, when acquisition mode is activated, by transforming the pitch axis unit vector into the inertial frame according to formula 1, below:

$$V_t = T_{ib}(1) V_b \tag{1}$$

where $V_b = [0\ 0\ 1]$ is the pitch axis unit vector in the body frame, $V_t$, is the target vector in the inertial frame, and $T_{ib}(1)$ is the transformation from body to inertial coordinates at the time that the re-acquisition mode is activated.

It is not necessary that $T_{ib}$ be accurate. In fact, it is quite possible that this matrix may be corrupted. It is only necessary that the change in $T_{ib}$ from the time of target initialization reflect the actual change in the spacecraft attitude. This is accomplished by propagating the spacecraft inertial attitude using the gyro data from the IMU.

The attitude control error that drives the pitch axis to the target vector is given by formula 2, below:

$$\epsilon = V_b \times T_{bi} V_t \tag{2}$$

where $T_{bi}$ is the transformation from inertial to body coordinates, and × denotes the vector cross product.

Figure 2:
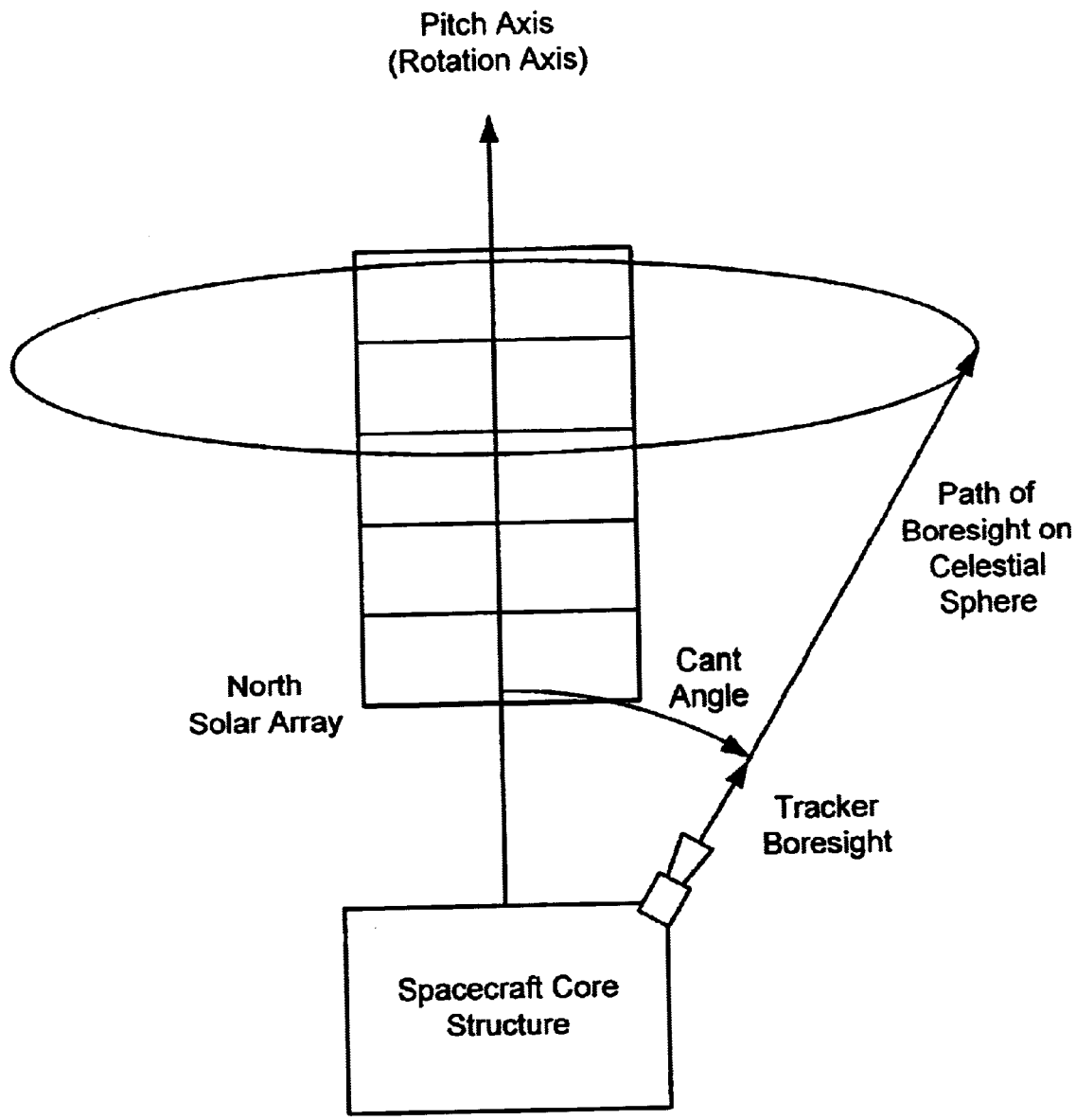
FIG. 2 represents an embodiment of a spacecraft in the process of carrying out a step of a method for rapid earth reacquisition according to the present invention.

The rate error that causes the spacecraft to rotate about the inertial target is given by formula 3 below:

$$\omega_{error} = r_c V_b - \omega_b \tag{3}$$

where $r_c$ is the commanded rotation rate, and $\omega_b$ is the measured body rate vector from the IMU As shown in FIG. 2, as the spacecraft rotates about the inertial target vector the STA boresight may sweep out a circle on the celestial sphere. The radius of the circle may be determined by the cant angle of the STA from the pitch axis. Provided that this angle is sufficiently large to guarantee an unobstructed view of space, that is, without blockage by the Sun, Moon, or Earth, over a specified portion of the rotation, the STA will see sufficiently many stars to determine its inertial attitude quaternion. For a representative pitch rotation rate of 0.2 deg/sec, this attitude determination step takes at most 30 minutes.

Once the tracker determines its attitude, the spacecraft inertial attitude quaternion $q_{bi}$ may be initialized according to formula 4, below:

$$q_{bi} = q_{bt} \otimes q_{ti} \tag{4}$$

where $q_{ti}$ is the star tracker output quaternion, $q_{bt}$, is the tracker to spacecraft body frame quaternion, and $\otimes$ denotes quaternion multiplication. The tracker to spacecraft body frame quaternion is known based on measurements of the orientation of the star tracker in the body frame made prior to the spacecraft launch.

Following attitude initialization, subsequent quaternion measurements may be processed by a Kalman filter to obtain estimates of the spacecraft attitude and the gyro biases.

After the attitude initialization, the second step of the process may begin by aligning the spacecraft pitch axis with the Earth pole axis $V_p$. Knowledge of the pole axis (within about 0.5 deg ignoring precession and nutation over a period of 25 years) does not depend on having an accurate on-board spacecraft clock, which may have been corrupted during the anomaly. Control of the pitch axis to the Earth pole vector is accomplished using the cross product attitude error given by formula 5, below:

$$\epsilon = V_b \times T_{bi} V_p \tag{5}$$

Once the pole axis is acquired, which takes at most 15 minutes at an attitude slew rate of 0.2 degrees/second, the spacecraft rotates slowly about the pitch axis to facilitate ground contact.

For a geosynchronous spacecraft, aligning the pitch axis with the pole axis and rotating provides several benefits. First, after such alignment, the spacecraft is in an attitude that is very similar to the mission attitude, with the yaw/roll plane parallel to the equatorial plane. The angle between the yaw/roll plane and the Sun can be at most about 23.5 degrees, depending on the time of year. This means the minimum average solar array power over a rotation period will be about 29% of the normal power level.

If the payload is turned off during the recovery because of low battery state-of-charge, the solar array power will be more than sufficient to operate the spacecraft bus and charge the batteries. Another benefit of the polar attitude is that it puts the spacecraft in a good attitude for communications with the ground. For spacecraft with an omni-directional antenna aligned with the pitch axis, telemetry and command contact typically is continuous. Another benefit, is that the geometry guarantees that the STA field-of-view will be unobstructed by the Sun, Moon, or Earth, and attitude measurements will be continuously available.

For the final step in the acquisition sequence, which may be referred to as Step 3 in an embodiment that includes three steps, the ground may verify that the clock and on-board ephemeris are valid and then command the switch to the normal control mode. This mode may reorient the spacecraft to align its body axes with the Earth-pointing (orbital) reference frame. Assuming that about 30 minutes is required for spacecraft checkout by the ground, and about 15 minutes is required to acquire the orbit frame, the total time to re-acquire the Earth and restore normal pointing performance is about 1.5 hours.

Another embodiment of the present invention can eliminate the need for the ground to verify the clock and on-board ephemeris in Step 3 before resuming Earth-pointing control. As the spacecraft rotates about the pitch axis during step 2, the uplink carrier signal strength may be monitored in order to find the location, in the form of the angle about the pitch axis, with the maximum signal strength thereby determining the location of the Nadir vector. The spacecraft may then automatically switch to an Earth-pointing control mode, adjusting the spacecraft pitch angle to maximize the carrier signal strength while keeping the pitch axis aligned with the Earth polar axis. The spacecraft may then later be switched to the normal control mode by ground command when the clock and on-board ephemeris have been verified.

Alternatively, with the spacecraft controlled to an earth-oriented pitch attitude based on the signal strength measurements, it is possible to perform an on-board consistency check to verify the validity of the ephemeris and clock. The check involves computing the Nadir vector in the spacecraft body frame using the current spacecraft to inertial-to-body quaternion. If the computed Nadir vector is close to the spacecraft minus yaw (−x) axis (the axis that is earth-oriented during normal operating conditions), then the ephemeris and clock are inferred to be valid, and the spacecraft automatically switches to the normal star tracker-based control mode. If the validity check fails, then the spacecraft waits for the ground to upload a corrected ephemeris and clock.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

I claim:

1. A method for a spacecraft to re-acquire an earth-pointing attitude, the method comprising:

determining an attitude of the spacecraft by rotating the spacecraft about its pitch axis and measuring star patterns during the rotation;

aligning a pitch axis of the spacecraft with earth's pole axis;

reorienting the spacecraft with respect to an earth-pointing reference frame.

2. The method according to claim 1, wherein reorienting the spacecraft with respect to an earth-pointing reference frame comprises rotating the spacecraft about the pitch axis to determine a spacecraft pointing direction that causes the spacecraft to receive a strongest uplink carrier signal strength from earth.

3. The method according to claim 1, wherein reorienting the spacecraft with respect to an earth-pointing reference frame comprises:

uploading a valid spacecraft clock and ephemeris to the spacecraft; and reorienting the spacecraft using the valid spacecraft clock and ephemeris.

4. The method according to claim 1, wherein reorienting the spacecraft with respect to an earth-pointing reference frame comprises:

obtaining an uplink carrier signal strength; and after aligning the pitch axis of the spacecraft with earth's pole axis establishing a pitch reference angle based upon the measured uplink carrier signal strength.

5. The method according to claim 1, wherein the spacecraft is rotated about its pitch axis at a rate of about 0.2 to about 0.3 degrees per second.

6. The method according to claim 1, wherein the spacecraft automatically reorients to align its body axes with an earth-pointing reference frame.

7. The method according to claim 1, wherein reorientation of the spacecraft with respect to the earth-pointing reference frame is directed from the earth.

8. The method according to claim 1, wherein a Kalman filter is utilized to determine the inertial attitude of the spacecraft.

9. The method according to claim 8, wherein the Kalman filter determines the spacecraft inertial attitude and gyro rate biases utilizing Inertial Measurement Unit angular rate data and star tracker inertial attitude measurements.

10. The method according to claim 1, wherein reorienting the spacecraft with respect to an earth-pointing reference frame comprises:

monitoring an uplink carrier signal strength during rotation of the spacecraft to determine a spacecraft pointing direction that causes the spacecraft to receive a maximum signal strength;

adjusting a pitch angle of the spacecraft to maximize carrier signal strength while maintaining the spacecraft pitch axis aligned with the earth polar axis.

11. The method according to claim 1, wherein determining an attitude of the spacecraft further comprises:

determining an inertial attitude of the spacecraft by computing an inertial target vector by transforming a pitch axis vector into an inertial coordinate frame.

12. The method according to claim 11, further comprising:

determining the orientation of the at least one star tracker with respect with respect to the spacecraft body frame.

13. The method according to claim 1, wherein aligning the pitch axis of the spacecraft with the pole axis of the earth is carried out at a rate of about 0.02 degrees per second.

14. A system for controlling a spacecraft re-acquisition of an earth-pointing attitude, the system comprising:

at least one star tracker operable to measure star patterns;

at least one attitude control device operable to alter an attitude of the spacecraft; and at least one processor operable to:

determine an attitude of the spacecraft by analyzing star patterns measured with the at least one star tracker while the spacecraft is rotated about its pitch axis;

command the at least one attitude control device to alter the attitude of the spacecraft so that a pitch axis of the spacecraft is aligned with earth's pole axis; and command the at least one attitude control device to alter the attitude of the spacecraft so that the spacecraft is reoriented with respect to an earth-pointing reference frame.

15. The system according to claim 14, wherein the at least one star tracker comprises a processor operable to match measured star patterns to a star catalog to determine the star tracker three-axis inertial attitude.

16. The method according to claim 12, further comprising:

initializing a spacecraft inertial attitude quaternion using star tracker inertial attitude measurements and the orientation of the at least one star tracker with respect to the spacecraft body frame.

17. The method according to claim 1, wherein reorienting the spacecraft with respect to an earth-pointing reference frame comprises:

rotating the spacecraft about the pitch axis to obtain contact with the earth;

verifying whether the spacecraft clock and on-board ephemeris are valid;

if the spacecraft clock and on-board ephemeris are not valid, uploading a valid spacecraft clock and ephemeris to the spacecraft; and reorienting the spacecraft using the valid spacecraft clock and ephemeirs.

18. The method according to claim 10, further comprising:

verifying the validity of an on-board spacecraft clock and ephemeris by:

computing a Nadir vector of the spacecraft body frame; and determining whether the Nadir vector is close to a spacecraft minus yaw axis;

wherein if the Nadir vector is close to a spacecraft minus yaw axis, the on-board spacecraft clock and ephemeis are inferred to be valid.

19. The system according to claim 14, wherein the at least one processor is operable to match measured star patterns to a star catalog to determine the star tracker three-axis inertial attitude.

20. The system according to claim 14, wherein the at least one attitude control device comprising one or more thrusters, one or more reaction wheels, or a combination of one or more thrusters and one or more reaction wheels.

21. A spacecraft adapted to re-acquire an earth-pointing attitude, the spacecraft comprising:
at least one attitude control device operable to alter an attitude of the spacecraft; and
at least one processor operable to:
determine an attitude of the spacecraft by analyzing star patterns measured with the at least one star tracker while the spacecraft is rotated about its pitch axis;
command the at least one attitude control device to alter the attitude of the spacecraft so that a pitch axis of the spacecraft is aligned with earth's pole axis; and
command the at least one attitude control device to alter the attitude of the spacecraft so that the spacecraft is reoriented with respect to an earth-pointing reference frame.

22. The spacecraft according to claim 21, wherein the at least one star tracker comprises a processor operable to match measured star patterns to a star catalog to determine the star tracker three-axis inertial attitude.

23. The spacecraft according to claim 21, wherein the at least one processor is operable to match measured star patterns to a star catalog to determine the star tracker three-axis inertial attitude.

24. The spacecraft according to claim 21, wherein the at least one attitude control device comprises one or more thrusters, one or more reaction wheels, or a combination of one or more thrusters and one or more reaction wheels.

25. A system for controlling a spacecraft re-acquisition of an earth-pointing attitude, the system comprising:
means for determining an attitude of the spacecraft by analyzing star patterns while the spacecraft is rotated about its pitch axis;
means for aligning a pitch axis of the spacecraft with earth's pole axis; and
means for reorienting the spacecraft with respect to an earth-pointing reference frame.

26. The system according to claim 25, wherein the means for reorienting the spacecraft with respect to an earth-pointing reference frame is configurated to rotate the spacecraft about the pitch axis and determine a spacecraft pointing direction that causes the spacecraft to receive a strongest uplink carrier signal strength from earth.

27. The system according to claim 25, wherein the means for reorienting the spacecraft with respect to an earth-pointing reference frame is configured to:
receive a valid spacecraft clock and ephemeris; and
reorient the spacecraft using the valid spacecraft clock and ephemeris.

28. The system according to claim 25, wherein the means for reorienting the spacecraft with respect to an earth-pointing reference frame is configured to:
receive an uplink carrier signal strength; and
establish a pitch refernce angle based upon the measured uplink carrier signal strength.

29. The system according to claim 25, wherein the spacecraft is rotated about its pitch axis at a rate of about 0.2 to about 0.03 degrees per second.

30. The system according to claim 25, wherein the means for determining the attitude of the spacecraft directs the spacecraft to automatically reorient to align its body axes with an earth-pointing reference frame.

31. The system according to claim 25, wherein the means for reorienting the spacecraft with respect to an earth-pointing reference frame is directed from the earth.

32. The system according to claim 25, wherein the means for determining an attitude of the spacecraft comprises a Kalman filter to determine the inertial attitude of the spacecraft. 22

33. The system according to claim 32, wherein the Kalman filter determines the spacecraft inertial attitude and gyro rate biases utilizing Inertial Measurement Unit angular rate data and star tracker inertial attitude measurements.

34. The system according to claim 25, wherein the means for reorienting the spacecraft with respect to an earth-pointing reference frame is configured to:
monitoring an uplink carrier signal strength during rotation of the spacecraft and determine a spacecraft direction that causes the spacecraft to receive a maximum signal strength; and
adjust a pitch angle of the spacecraft to maximum carrier signal strength while maintaining the spacecraft pitch axis aligned with the earth polar axis.

35. The system according to claim 25, wherein the means for determining an attitude of the spacecraft is configured to determine and inertial attitude of the spacecraft by computing an inertial target vector by transforming a pitch axis vector into an inertial coordinate frame.

36. The system according to claim 35, wherein the means for determining an attitude of the spacecraft comprises at least one star tracker and is further configured to determine the orientation of the at least one star tracker with respect to the spacecraft body frame.

37. The system according to claim 36, wherein the means for determining an attitude of the spacecraft is further configured to initialize a spacecraft inertial attitude quaternion using star measurements and the orientation of the at least one star tracker with respect to the spacecraft body frame.

38. The system according to claim 25, wherein the means for aligning the pitch axis of the spacecraft with the pole axis of the earth carries out the alignment at a rate of aboutb 0.02 degrees per second.

39. The system according to claim 25, wherein the means for reorienting the spacecraft with respect to an earth-pointing reference frame is configured to:
rotate the spacecraft about the pitch axis to obtain contact with the earth;
verify whether the spacecraft clock and on-board ephemeris are valid;
if the spacecraft clock and on-board ephemeris are not valid, receive a valid spacecraft clock and ephemeris from another source; and
reorient the spacecraft using the valid spacecraft clock and ephemeris.

40. The system according to claim 34, wherein the means for reorienting the spacecraft with respect to an earth-pointing reference frame is further configured to:
verify the validity of an on-board spacecraft clock and ephemeris by:
computing a Nadir vector of the spacecraft body frame; and
determining whether the Nadir vector is close to a spacecraft minus yaw axis;
wherein if the Nadir vector is close to a spacecraft minus yaw axis, the on-board spacecraft clock and ephemeris are inferred to be valid.

41. A spacecraft adapted to re-acquire an earth-pointing attitude, the spacecraft comprising:
means for determining an attitude of the spacecraft by analyzing star patterns while the spacecraft is rotated about its pitch axis;

means for aligning a pitch axis of the spacecraft with earth's pole axis; and means for reorienting the spacecraft with respect to an earth-pointing reference frame.

42. The spacecraft according to claim 41, wherein the means for reorienting the spacecraft with respect to an earth-pointing reference frame is configured to rotate the spacecraft about the pitch axis and determine a spacecraft pointing direction that causes the spacecraft to receive a strongest uplink carrier signal strength from earth.

43. The spacecraft according to claim 41, wherein the means for reorienting the spacecraft with respect to an earth-pointing reference frame is configured to:

receive a valid spacecraft clock and ephemeris; and reorient the spacecraft using the valid spacecraft clock and ephemeris.

44. The spacecraft according to claim 41, wherein the means for reorienting the spacecraft with respect to an earth-pointing reference frame is configured to:

receive an uplink carrier signal strength; and establish a pitch reference angle based upon the measured uplink carrier signal strength.

45. The spacecraft according to claim 41, wherein the spacecraft is rotated about its pitch axis at a rate of about 0.2 to about 0.03 degrees per second.

46. The spacecraft according to claim 41, wherein the means for determining an attitude of the spacecraft directs the spacecraft to automatically reorient to align its body axes with an earth-pointing reference frame.

47. The spacecraft according to claim 41, wherein the means for reorienting the spacecraft with respect to an earth-pointing reference frame is directed from the earth.

48. The spacecraft according to claim 41, wherein the means for determining an attitude of the spacecraft comprises a Kalman filter to determine the inertial attitude of the spacecraft.

49. The spacecraft according to claim 48, wherein the Kalman filter determines the spacecraft inertial attitude and gyro rate biases utilizing Inertial Measurement Unit angular rate data and star tracker inertial attitude measurements.

50. The spacecraft according to claim 41, wherein the means for reorienting the spacecraft with respect to an earth-pointing reference frame is configured to:

monitor an uplink carrier signal strength during rotation of the spacecraft and determine a spacecraft pointing direction that causes the spacecraft to receive a maximum signal strength; and adjust a pitch of the spacecraft to maximize carrier signal strength while maintaining the spacecraft pitch axis aligned with the earth polar axis.

51. The spacecraft according to claim 41, wherein the means for determining an attitude of the spacecraft is configured to determine an inertial attitude of the spacecraft by comprising an inertial target vector by transforming a pitch axis vector into an inertial coordinate frame.

52. The spacecraft according to claim 51, wherein the means for determining an attitude of the spacecraft comprises at least one star tracker and is further configured to determine the orientation of the at least one star tracker with respect to the spacecraft body frame.

53. The spacecraft according to claim 52, wherein the means for determining an attitude of the spacecraft is further configured to initialize a spacecraft inertial attitude quaternion using star measurements and the orientation of the at least one star tracker with respect to the spacecraft body frame.

54. The spacecraft according to claim 41, wherein the means for aligning the pitch axis of the spacecraft with the pole axis of the earth carries out the alignment at a rate of about 0.02 degrees per second.

55. The spacecraft according to claim 41, wherein the means for reorienting the spacecraft with respect to an earth-pointing reference frame is configured to:

rotate the spacecraft about the pitch axis to obtain contact with the earth;

verify whether the spacecraft clock and on-board ephemeris are valid;

if the spacecraft clock and on-board ephemeris are not valid, receive a valid spacecraft clock and ephemeris from another source; and reorient the spacecraft using the valid spacecraft clock and ephemeris.

56. The spacecraft according to claim 50, wherein the means for reorienting the spacecraft with respect to an earth-pointing reference frame is further configured to:

verify the validity of an on-board spacecraft clock and ephemeris by:

computing a Nadir vector of the spacecraft body frame; and determining whether the Nadir vector is close to a spacecraft minus yaw axis;

wherein if the Nadir vector is close to a spacecraft minus yaw axis, the on-board spacecraft clock and ephemeris are inferred to be valid.

\* \* \* \* \*

UNITED STATES PATENT AND TRADEMARK OFFICE
CERTIFICATE OF CORRECTION

PATENT NO.   : 6,695,263 B1
DATED        : February 24, 2004
INVENTOR(S)  : Neil E. Goodzeit It is certified that error appears in the above-identified patent and that said Letters Patent is hereby corrected as shown below:

Column 7,
Line 44, "0.3 degrees" should read -- 0.03 degrees --.

Column 8,
Line 9, the second occurrence of "with respect" should be deleted.
Line 52, "ephemeirs." should read -- ephemeris. --.
Line 63, "ephemeirs" should read -- ephemeris. --.

Column 9,
Line 2, "comprising" should read -- comprises --.
Line 7, at lease one start tracker operable to measure star patterns; -- should be added.
Line 42, "configurated" should read -- configured --.

Column 10,
Lines 3-4, "spacecraft.22" should read -- spacecraft. --.
Line 12, "monitoring" should read -- monitor --.

Column 12,
Line 7, "comprising" should read -- computing --.

Signed and Sealed this

Twenty-seventh Day of July, 2004

JON W. DUDAS
*Acting Director of the United States Patent and Trademark Office*